United States Patent [19]

Kayoun

[11] 4,406,732

[45] Sep. 27, 1983

[54] PROCESS FOR THE CONTROLLED MODIFICATION OF THE GEOMETRICAL-CHARACTERISTICS OF THE END OF A MONOMODE OPTICAL FIBER AND APPLICATION THEREOF TO OPTICAL COUPLING

[75] Inventor: Pierre Kayoun, Paris, France

[73] Assignee: Thomson-CSF, Paris, France

[21] Appl. No.: 354,792

[22] Filed: Mar. 4, 1982

[30] Foreign Application Priority Data

Mar. 17, 1981 [FR] France .................. 81 05287

[51] Int. Cl.³ .................. B44C 1/22; C03C 15/00; C03C 25/06; G01N 21/00
[52] U.S. Cl. .................. 156/626; 65/31; 156/628; 156/633; 156/645; 156/651; 156/655; 156/663; 350/96.29; 356/73.1
[58] Field of Search ............... 156/626, 627, 628, 633, 156/645, 649, 651, 655, 657, 663; 65/31; 356/73.1; 252/79.3; 350/96.1, 96.15, 96.17, 96.29

[56] References Cited

PUBLICATIONS

Optical Communication Conference, Amsterdam, Sep. 17-19, 1979, Fabrication of Coupling Fibres with Spherical End Faces by a Selective Etching/Melting Technique by S. Hopland et al., pp. 9.3-1 to 9.3-4.
IBM Technical Disclosure Bulletin, vol. 20, No. 3, Aug. 1977, Fabrication of Lenses on Tips of Fibers by J. D. Crow et al., pp. 1235-1236.

Primary Examiner—William A. Powell
Attorney, Agent, or Firm—Cushman, Darby & Cushman

[57] ABSTRACT

A process is provided consisting in etching the end of a monomode optical fiber so as to modify the geometrical characteristics thereof, plotting the profile of the remote field and comparing it with that of another monomode optical element to be coupled, for example a semiconductor laser.

11 Claims, 12 Drawing Figures

PROCESS FOR THE CONTROLLED MODIFICATION OF THE GEOMETRICAL-CHARACTERISTICS OF THE END OF A MONOMODE OPTICAL FIBER AND APPLICATION THEREOF TO OPTICAL COUPLING

BACKGROUND OF THE INVENTION

The invention relates to a process for the controlled modification of the geometrical characteristics of the endmost face of a monomode optical fiber particularly with a view to providing optimized coupling with another monomode optical element, this element being able to be without distinction another optical fiber, an integrated wave-guide or a laser.

Such devices are more especially used in optical connection systems. These systems are used for providing optical path telecommunications in numerous fields. By way of non limiting examples there may be mentioned telephone or telex transmission, telematics or teledistribution.

For transmissions over long distances, very low loss optical fibers are used. Particular care must be taken with couplings between optical fibers on the one hand and, on the other hand, between the optical fibers and the opto-electronic means for emitting and detecting the radiant energy transmitted by these optical fibers.

As is known, the connection may be of the multimode or monomode type, these latter allowing connection with a higher flowrate and lower attenuation over long distances.

For these applications, efforts have then been made to form optical systems comprising only monomode elements such as semiconductor lasers, integrated waveguides or monomode optical fibers.

One of the fundamental problems which arises in a monomode transmission chain is that of coupling between the different monomode elements, this is all the more acute than when multimode elements are used. In fact, in each element a mode is excited which is not necessarily adapted to the next element in the chain. Thus, so as to couple a maximum of energy into the downstream monomode element, the upstream mode must be modified and matched, or the reverse.

A particularly delicate example of coupling to be achieved is the coupling between a divergent radiation source, particularly a transverse monomode semi-conductor laser, and a monomode optical fiber. Direct coupling, in which the source and the fiber are simply placed face to face without an intermediate optical element is of low efficiency because of the reduced dimensions of the fiber and of the generally large aperture of the laser beam. So as to increase this efficiency, different optical configurations have been studied on the basis of cones, cylindrical, semicylindrical or spherical lenses, hemispherical lenses. Theoretical and practical studies show that interesting results can be obtained with a hemispherical lens coupled to the end of the fiber. Different manufacturing methods have been proposed. Among these, thermo-forming, which consists in melting the end of the fiber by any means, has been described more particularly in two articles published in 1975 in the review "Applied Optics": vol. 14, no. 2, pages 294–298 and vol. 14, no. 12, pages 2815–2816. This technique often requires, especially for the silica fibers commonly used, very high temperatures, so heavy apparatus.

A simpler solution to this problem was described in French patent application published under the no. 2 465 238 entitled: "Dispositif de couplage entre une source lumineuse de rayonnement divergent et une fibre optique at procede de realisation d'un tel dispositif".

This patent application relates to the construction of a plano-convex lens made from high index glass on any type of fiber. The coupling device comprises a plano-convex lens coupled to the input face of the fiber, formed from a glass having a refraction index greater than that of the fiber and obtained by placing the end of the fiber in contact with a drop of molten glass. A spherical skul-cap shape is obtained whose parameters are controllable.

Although simpler to use than the previously known processes, this process requires nevertheless the creation of an added element, foreign to the fiber: the plano-convex lens; and having a geometry defined once and for all: demi-sphere.

On the contrary, the invention proposes a process for elaborating a phase object on the endmost face of the fiber which remains simple to use while permitting increased flexibility with respect to the processes of the prior art. Moreover, this process does not require the addition of external elements to the fiber, the modification made to the fiber for the elaboration of said phase object being carried out in a continually controllable way.

The invention provides then a process for the controlled modification of the geometrical characteristics of the end of a monomode optical fiber, the fiber being formed from a central region and at least one peripheral region having different optical refraction indices, these index differences being obtained by incorporating in a basic material in a given percentage at least one doping material, which process comprises the following steps:

previous preparation of the end of said fiber so as to obtain an endmost face free from splinters;

chemical etching for a pre-determined period of time at differentiated rates of said regions with given doping percentages at the end of the fiber;

neutralization of the etching;

injection into the fiber of guided radiation and control of the state of modification of said geometrical characteristics of the end of the fiber by plotting the variations of the profile of the remote field of said radiation radiated by this etched end.

The invention has further as object the application of this modification process to the coupling of a monomode optical fiber with another monomode element.

BRIEF DESCRIPTION OF THE DRAWINGS

The invention will be better understood and other advantages will appear from the following description with reference to the accompanying figures.

DESCRIPTION OF THE PREFERRED EMBODIMENT

Figure 1:
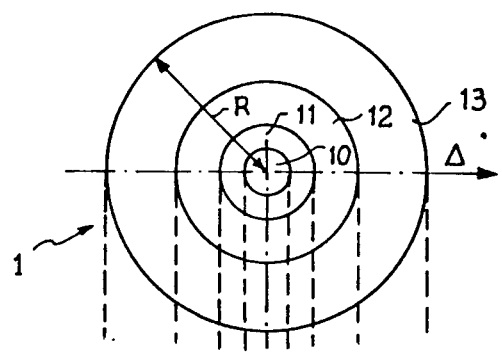
FIGS. 1 and 2 show in section a monomode optical fiber and the diagram representing the optical refraction index profile of such a fiber.

Before describing the process of the invention, it will be useful first of all to briefly recall the principal characteristics of optical fibers and the manner in which these fibers are obtained.

One of the most widely used processes for manufacturing optical fibers is known under the abbreviation "MCVD" (modified chemical vapor-phase deposition). This process consists in causing to flow inside a silica tube a gas mixture comprising more particularly oxygen and silicon, germanium or boron compounds, these latter being introduced into the tube in predetermined sequences. The tube is heated by a heat source which is moved in a direction longitudinal to this tube. The cycle is begun again several times. At each passage through the heated zones, there occurs an oxydo-reduction reaction of the components in presence and the deposition of silicon, boron or germanium oxides on the internal wall. At each passage of the tube past the heat source, a new layer is deposited.

Then a final step is carried consisting in vigorously heating the silica tube. Collapsing occurs. The product obtained is called preform and is in the form of a bar having external dimensions typically of the order of 9 mm. This preform will serve for the manufacture of the optical fibers properly speaking, which will be obtained by drawing this preform. After this final phase, the fiber will have an external diameter of about 125 μm.

As is known, an optical fiber comprises a core, an optical sheath, a supporting tube and a sheath which are essentially differentiated from each other by their optical refraction index. The evolution of this optical refraction index must take place according to a definite profile. To reach this result, it is necessary to deposit on the internal face of the original tube different materials so that the optical refraction index varies according to a profile homothetic to the one desired for the optical fiber. By way of example, with the mean refraction index being that of silica, i.e. that of the tube, if it is desired to increase the refraction index germanium dioxide may be introduced in a given percentage.

After drawing, the optical fiber will most often be formed of two regions, core and optical sheath, a support tube formed by the material of the original tube and an outer protection sheath disposed about this support tube in a subsequent manufacturing phase.

There exist two types of fibers:

optical fibers of the so-called multimode type, in which the core diameter is typically of 50 μm and the outer diameter of the optical sheath is 70 μm;

fibers of the so-called monomode type, in which the core diameter is between 5 and 10 μm and the outer diameter of the optical sheath is about 40 μm.

The outer diameter of the support tube, most frequently made from pure silica, is about 125 μm and the outer diameter of the protection sheath, made for example from silicon, is of the order of 300 μm.

The fibers may present an index jump or an index gradient.

The invention relates to fibers of the monomode type.

FIG. 1 shows in section an optical fiber. R is the outer radius of the fiber. There is shown in FIG. 1 the different regions: core 10, optical sheath 11, support tube 12 and protection sheath 13.

Figure 2:
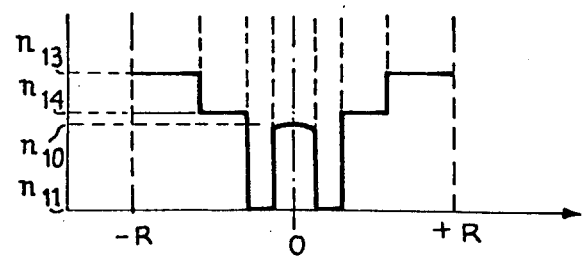

FIG. 2 shows one example among others of the index profile of an optical fiber able to be used in the invention. The profile shows the index variations along an axis Δ passing through the center of the fiber.

In the chosen example, core 10 is made from very slightly doped silica. The doping is not uniform so as to obtain a bell-shaped index variation having a maximum value $n_{10}$. The optical sheath 11 of index $n_{11}$ is made from boron doped silica, the doping material also comprising traces of phosphorous. The support tube 12 is made from pure silica of index $n_{12}$ slightly greater than $n_{10}$. Finally, the protection sheath 13 is made from epoxy with an index $n_{13}$.

The following relationship: $n_{13} > n_{12} > n_{10} > n_{11}$ is confirmed.

Other optical fibers having optical refraction index profiles entirely different from the one shown in FIG. 2 can of course be used within the scope of the invention, the purpose of this example being solely to present a concrete form of embodiment.

As was previously recalled, to obtain optimized coupling between two monomode optical elements, it is necessary to modify the mode of one of these elements. If it is a question for example of coupling a monomode optical fiber with a radiant energy emitter of the semiconductor laser type, it seems excluded to be able to modify simply the emission mode of this latter. It is then necessary to modify the geometry of the endmost face of the optical fiber, i.e. more particularly of the dioptre which the guiding structure, the core, forms with the outer environment, generally the ambient air.

In the prior art, as has already been mentioned, one of the solutions chosen for increasing the efficiency of coupling is to create a demi-spherical lens at the end of the fiber. However this process lacks flexibility.

The modifications of the guided mode in the neighbourhood of the end of the fiber which result from this arrangement are not in fact equally advantageous for all the kinds of coupling used in a monomode element optical transmission chain.

The invention takes advantage of the fact that the index variations along axis Δ (FIG. 1) are obtained by selectively doping the regions of the fiber with different materials, this in definite proportions. If the end of the fiber is subjected to chemical etching, it follows that the etching speed of these regions also varies depending on the nature and the concentration of the doping materials as well as on the product used for the chemical etching and the concentration thereof. This has as consequence that the geometry of the end of the optical fiber evolves concurrently. This has finally the effect of modifying the guided mode in this zone.

There remains however a difficulty: it is to be able to effectively control this modification close to the endmost face of the fiber, considering the dimensions of this latter, typically 125 μm diameter for the support tube 3.

To get round this difficulty, radiation is injected into the fiber by means of a laser emitter for example, and the propagation of this mode is studied in the free space at the output of the fiber at the end having undergone chemical etching, i.e. the distribution of the intensity of the radiation emitted in the remote field of Fraunhofer region.

This region is situated, as is known for a radiating structure of dimension D, at a distance greater than or equal to $2D^2/\lambda$ from this source, $\lambda$ being the wavelength. In the case of an optical fiber fed by a laser emitter, it is sufficient to operate at a few tens of micrometers to satisfy this condition. Furthermore, in the general case, with the end of the fiber being of revolution, it is sufficient to study the remote field in a single plane containing the axis of the fiber.

The evolution of the remote field is representative of the near field for there exists a biunivocal relationship between these two fields. Theoretical considerations allow passage from one to the other by means of Fourier's transform.

The controllable chemical etching amounts then in the last place, if we refer to what has been described previously, to modifying the remote field in a way which is also controllable.

In the process of the invention, the modifications may result in satisfying different criteria and thus adding a flexibility which the processes of the prior art could not offer.

In a first variation, the remote field of a monomode optical fiber is modified so as to cause it to resemble that of the monomode element into which it is desired to couple the light, for example to that of a semi-conductor laser whose proper remote field it is difficult to modify.

This matching of remote fields is equivalent to matching the modes and allows then the efficiency of coupling to be increased between the fiber and the other monomode element.

In a second variation, the modification also ensures maximum coupling but this when the two elements are not in contact immediately proximate one another, which is of great practical advantage: possibility of inserting an optical element such as attenuator, polarizer, modulator, etc... in the transmission chain.

The process of the invention will now be described in more detail. It comprises the following steps:

1. obtaining as a first step a good break by cleavage or any other process of the known art of the end of the monomode optical fiber so as to obtain a splinterless face. The result of the operation may be checked by means of a microscope.
2. cleaning the end of the fiber with alcohol for example,
3. steeping this end in an acid solution for a given time t;
4. cleaning with water and alcohol the end of the fiber so as to neutralize the etching,
5. plotting the profile of the remote field diffracted by the end of the fiber;
6. comparison of this remote field with a profile to be obtained or at least with a profile with which the greatest possible correlation is to be obtained.

Steps 3 to 6 may be effected iteratively, until the anticipated result is obtained in step 6, this in the case where theoretical or experimental considerations do not allow the given time t to be defined in advance.

Finally, in the second variation of the process, if it is desired to obtain given coupling efficiency when the two elements to be coupled are placed at a pre-established distance from each other, step 6 such as previously defined may be replaced by the following step: the two elements are placed with respect to each other at this pre-established distance and the efficiency of the coupling is measured. An example of implementation of the process will be described in what follows with reference to FIG. 6.

To give an idea, there will be considered in what follows the coupling of a semi-conductor laser emitter with a monomode fiber. The principal characteristics of these two elements are given in the table below:

Fiber:
   core diameter 5 $\mu$m
   material forming the core: slightly doped silica
   optical sheath: doped mainly with boron
   index profile: according to FIG. 2

Laser:
   type AsGa
   wave-length $\lambda = 0.83$ $\mu$m
   dimensions of the cavity: $0.2 \times 4 \times 300$ (in $\mu$m)

Figure 5:
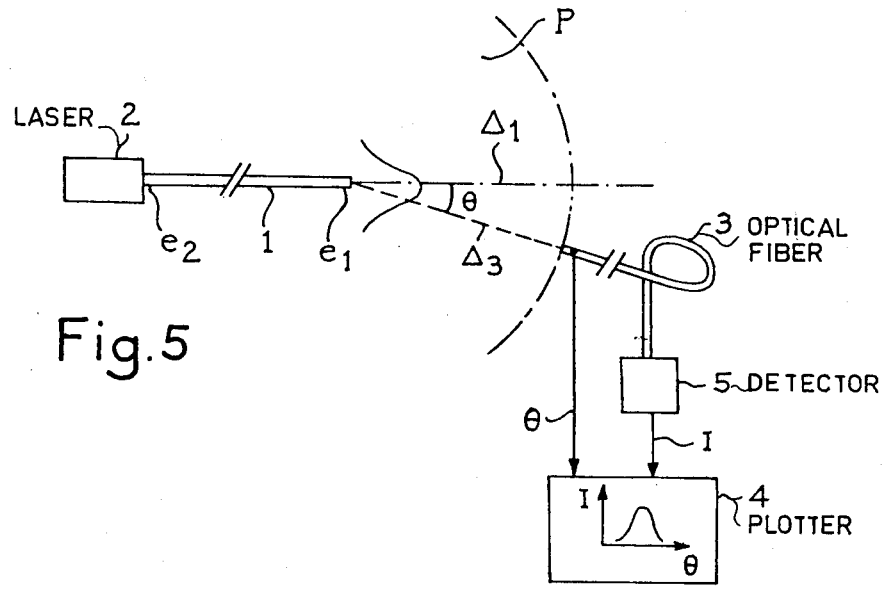
FIGS. 5 to 7 illustrate special measuring devices used in the process of the invention.

Under these conditions, the acid solution of step 3 may be 40% hydrofluoric acid solution. Steps 1, 2 and 4 use techniques well known in the optical fiber field and do not require fuller description. In so far as step no. 3 is concerned FIG. 5 shows schematically a device for plotting the remote field of the monomode fiber 1 whose end $e_1$ has been etched.

There is injected into the fiber, through end $e_2$, radiant energy produced by a laser source 2, which may be the laser source to be coupled or a source of the same type. The profile of the remote field of fiber 1 is plotted by means of an auxiliary detection fiber 3 in a plane P containing the axis of symmetry $\Delta_1$ of fiber 1. This plane may be a support on which source 2 and fiber 1 have been placed. The detection fiber may be firmly secured to a carriage moving over an arc of a circle whose center merges with the output face $e_1$ of fiber 1. A means (not shown in FIG. 5) for measuring angle $\theta$ which the axis of symmetry $\Delta_3$ of fiber 3 forms with the axis of symmetry of fiber 1 generates an electric control signal, for example a control voltage, having an amplitude proportional to angle $\theta$, which is transmitted to one of the control ends of a plotting table 4.

The light intensity collected by the detection fiber 3 is measured by means of a photo-detecting means 5, for example a photomultiplier, which converts this intensity into an electric signal I transmitted to the other control input of the plotting table 4.

Thus the chart of the remote field of fiber 1 is plotted, this after each etching cycle.

Figure 8:
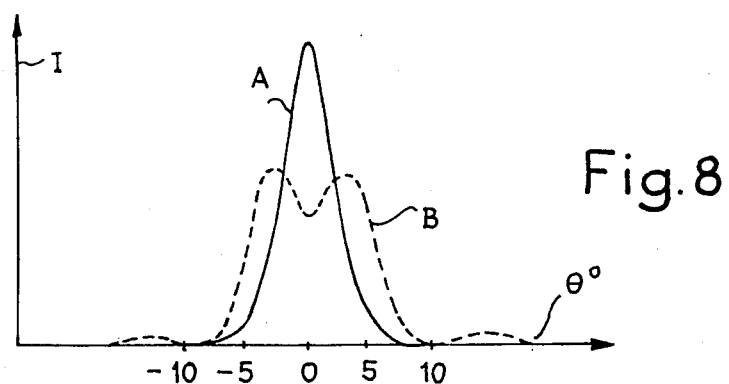
FIGS. 8 to 10 are diagrams illustrating the variations of the remote field of the optical fiber modified by the process of the invention.
Figure 9:
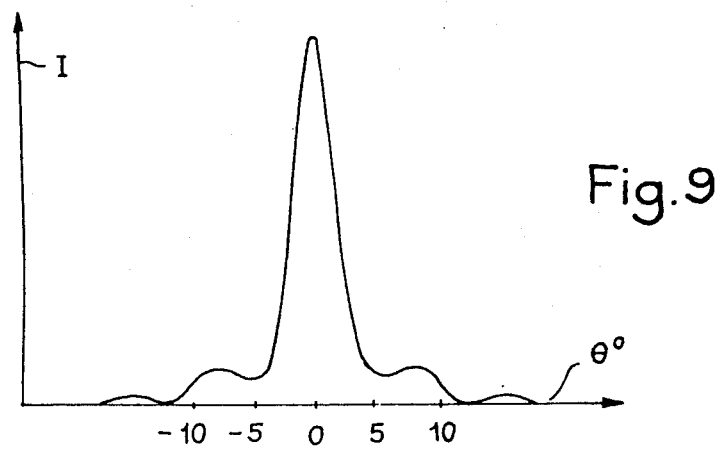
Figure 10:
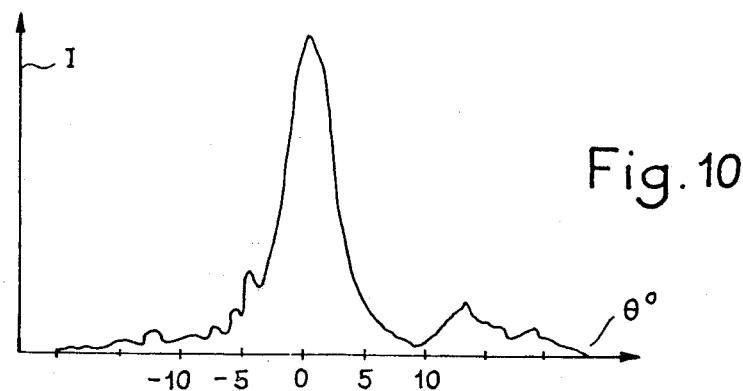

FIGS. 8 to 10 give an experimental example of plots representing the evolution of the remote field as a function of etching time t, the concentration of the acid solution remaining constant. The ordinate represents the relative optical intensity and the abscissa the angle $\theta$ in degrees.

In the diagram of FIG. 8, curve A represents the profile of the remote field of fiber 1 before chemical etching and curve B after about 1 minute's etching. A very clear widening of curve B can be seen.

Curves 9 and 10 show profiles of the remote field after respectively 3 and 15 minutes of chemical etching.

Figure 11:
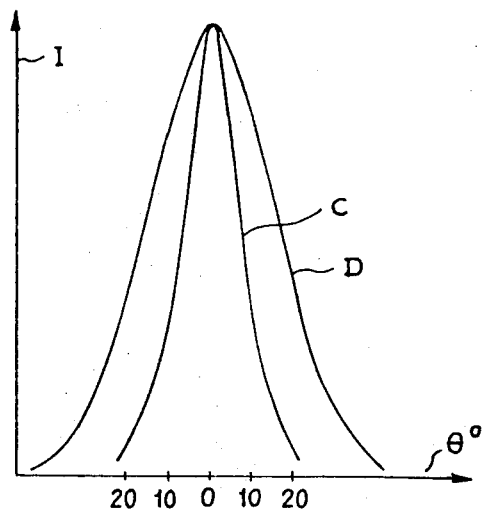
FIG. 11 is a diagram illustrating the remote field of a semi-conductor laser emitter.
Figure 12:
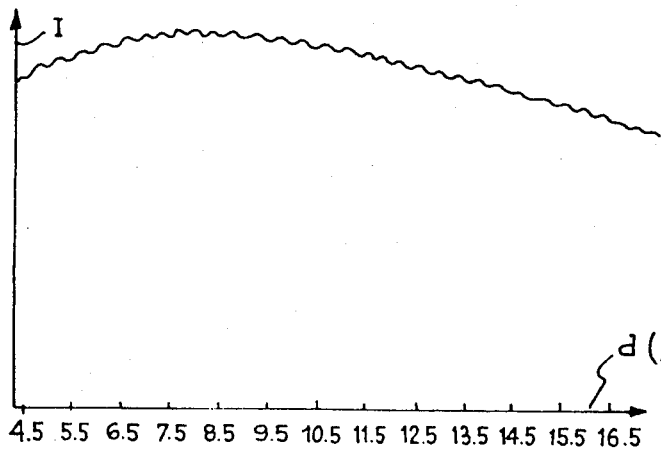
FIG. 12 is a diagram illustrating the efficiency of coupling between two monomode optical elements as a function of the distance separating them.

FIG. 11 shows the profile of the remote field of the laser to be coupled. It is known that the radiation diagram of semiconductor lasers is not of revolution but inscibed inside a curve which approximates to an ellipsis. In FIG. 11 have been shown the extremum profiles corresponding respectively, for curve C, to the plane parallel to the function forming the laser and to the plane orthogonal to this function for curve D.

It can be seen that an etching time corresponding to about 1 minute (FIG. 8: curve B) maximizes the overlapping integral of the remote fields of fiber 1 and of the laser to be coupled 2. Then the curves narrow again (FIGS. 9 and 10). In the example chosen, the time of 1 minute will be chosen, this naturally for the 40% hydrofluoric acid solution.

Figure 3:
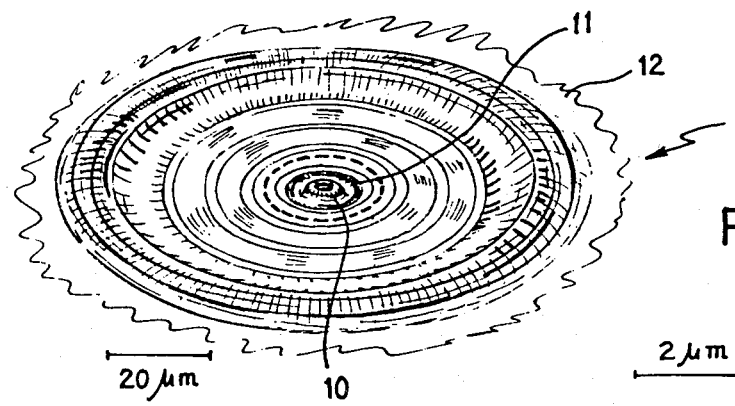
FIGS. 3 and 4 illustrate one example of modifications of the geometrical characteristics of the end of the fiber obtained by the process of the invention.
Figure 4:
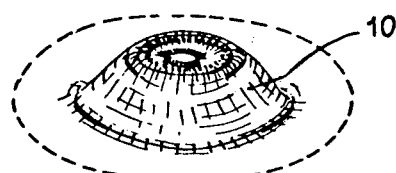

FIGS. 3 and 4 illustrate schematically the condition of the end $e_1$ of fiber 1 after this etching time A bowl is formed in the region constituted by the optical sheath 11. The core 10 of the fiber is in the form of a hummock shaped as a dome emerging from the bottom of the bowl.

The scales are given in FIGS. 3 and 4, this latter representing the central part (core 10) of the enlarged end $e_1$.

It is possible to automate the measurement of the remote field by replacing the detecting fiber 3 and photomultiplier assembly by a detector array, for example photodiode array. It is in fact possible, if we operate sufficiently distant from end $e_1$ of fiber 1, to carry out the measurements in a plane perpendicular to axis $\Delta_1$.

Figure 6:
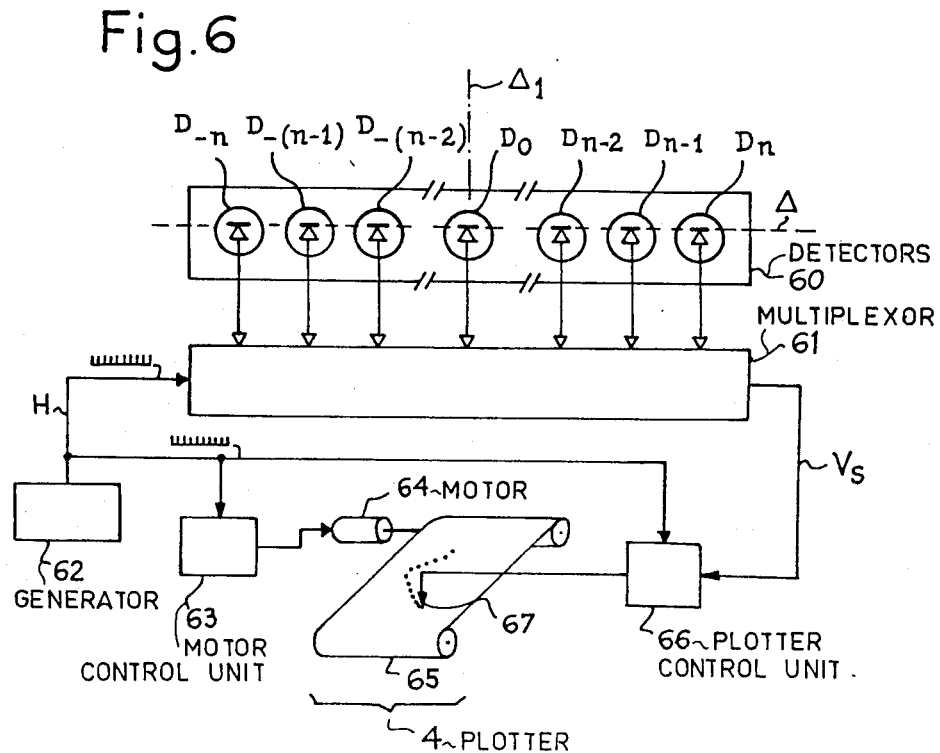

FIG. 6 shows the variation of the device for measuring the remote field as well as the principal circuits required for implementing this variation.

The diode array 60 comprises $(2n+1)$ diodes: $D_{-n}$... $D_o$... $D_n$ spaced apart along an axis $\Delta$ perpendicular to axis $\Delta_1$; diode $D_o$ being centered on axis $\Delta_1$. The distance between two successive diodes represents an elementary variation of the angle $\theta$.

The outputs of photodiodes $D_{-n}$ to $D_n$ are transmitted to an analog multiplexer 61. Such multiplexers are commercially available and comprise more especially a series of analog gates receiving, at a first input, the signals to be multiplexed, within the scope of the invention the output signals of diodes $D_{-n}$ to $D_n$ and, at a second input, binary enabling signals. The multiplexer receives for this clock signals H produced by a generator 62, these signals being transmitted, for example, to a relooped binary counter included in the multiplexer 60 having as many binray states as there are different signals to be multiplexed: $(2n+1)$ within the scope of the invention. Logic circuits, also proper to multiplexer 60, select one of these binary states so that, at all times, a single photodiode output is selected and transmitted to a common output of the analog multiplexer 60: $V_S$.

This output signal is transmitted to one of the inputs of a circuit 66 for controlling the pen 67 of a plotting table 4. This circuit may receive at another input the clock signals H used as enabling and sampling signals for controlling pen 67 point by point in synchronism with the scanning of the outputs of photodiodes $D_{-n}$ to $D_n$.

The clock signals H are also transmitted to a circuit 63 for controlling a stepper motor 64 driving the writing medium 65 of the plotting table.

This medium may be graduated in values of angle $\theta$ in abscissa and in the relative optical intensity I. As is well known, control circuit 66 comprises signal calibrating, matching and amplifying means which are outside the scope of the invention.

It is furthermore possible to use other types of display apparatus, such for example as an afterglow oscilloscope. A television camera may further be used as detecting element.

According to a second aspect of the invention which has been mentioned, it is possible to obtain maximum coupling when the two monomode optical elements are placed at a pre-established distance with respect to each other.

Figure 7:
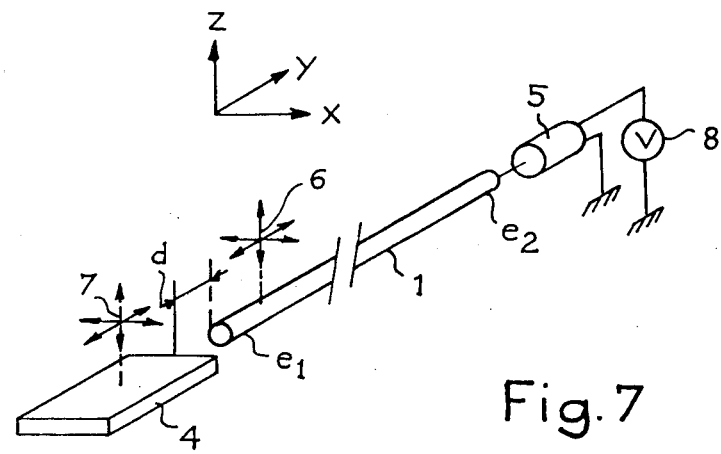

FIG. 7 illustrates a device for determining the etching time of the end $e_1$ of fiber 1 required for obtaining maximum coupling for a pre-established distance d. After step no. 4 of the process of the invention, end $e_1$ of fiber 1 and the laser 4 to be coupled are firmly locked mechanically respectively to micro-manipulators 6 and 7, the end faces of the two elements being separated from each other by the pre-established distance d. By means of these two micro-manipulators, which may effect movements parallel to the three axes of a reference trihedron X Y Z, the two elements to be coupled together are moved with respect to each other until maximum coupling is obtained. This coupling may be determined by placing at end $e_2$ of fiber 1 an opto-electronic means 5, for example a photomultiplier or a photodiode, detecting the optical intensity of the radiation transmitted by fiber 1 and converted into an electric signal measured by any appropriate apparatus 8. The etching time t required may be optimized in this way.

In all cases, the device which has just been described may be used in a final phase for achieving effective and maximum coupling of the two elements to be coupled. For example, in the variation described with reference to FIGS. 5 and 6, when the desired remote field profile is obtaned (step no. 6 of the process) the two elements to be coupled together are firmly locked to the micromanipulators 6 and 7 and, more particularly, the distance d separating the two elements is adjusted until maximum coupling is obtained. The two elements are then fixed in this position by any known process: sealing, bonding etc.

Within the scope of the example chosen, FIG. 2 illustrates the variations in efficiency of the coupling shown by the relative intensity I measured by detector 5, depending on the distance in micrometers separating the end faces of the laser 4 to be coupled with fiber 1. It appears clearly from the curve that the maximum is situated at about $d=8$ $\mu$m, a higher value (10 $\mu$m, for example) being able to be selected with a coupling efficiency which remains high.

The fluctuations of the curve represent a parasite phenomenon due to the "Perot-Fabry cavity effect". However, and this is an additional advantage, because the surface of the end face of the fiber after etching in accordance with the process of the invention is no longer flat, this parasite effect is significantly reduced: from 5 to 20% depending on the surface condition reached after chemical etching.

Still within the framework of the example considered, the coupling efficiency reaches typically 35%, as whereas for a laser and an identical non treated fiber, it is only 10%. Thus, with the process of the invention, the coupling efficiency has been considerably increased.

Furthermore, the 10% efficiency can only be obtained by placing opposite each other, the closest possible, the non treated fiber and the semi-conductor laser. Theoretically, the maximum efficiency is in fact obtained when the elements are placed in contact but, under penalty of damage, we cannot go below a distance of a few microns. On the other hand, with the process of the invention, the coupling efficiency is maximum not in contact but when the elements are spaced apart typically by ten micrometers or so.

Up to this point in the description of the process of the invention, it has been admitted that chemical etching produces symmetrical effects if we consider a plane orthogonal to the axis of symmetry of the fiber to be treated 1. This is effectively achieved because of the symmetry of revolution of fiber 1.

However, it may be advantageous, for certain applications, to obtain a remote field whose profile does not possess this symmetry of revolution.

If we refer again to FIG. 11, it is clear that the coupling of fiber 1 with laser 4 may be further improved if the profile of the remote field approximates that of the laser whatever the direction considered in a plane orthogonal to the axis of the fiber (FIG. 5: $\Delta_1$) In FIG. 11, curves C and D represent the profiles along two orthogonal axes.

Maximum coupling may be desired also when the axes of symmetry of the two elements to be coupled together form therebetween a given angle.

The condition stated in what has gone before may be fulfilled by starting with a fiber in which at least the end to be modified by etching in accordance with the process of the invention has been previously treated, for example during the manufacturing stage, so as not to present a symmetry of revolution.

During step 1 of the process, at the time of breaking, an end face may further be prepared presenting an angle with the optical axis different by $\pi/2$ radians.

In this case, contrary to what has been suggested up to now, the profile of the remote field must be plotted in the whole of space, or at least in certain privileged planes and not just in a single plane (FIG. 5: plane P) since the end of the fiber and the geometrical modifications made by the process of the invention no longer present the properties of symmetry of revolution. In the majority of applications, it may be sufficient to plot the remote field profile in two planes corresponding to the extrema similarly to what has been illustrated in FIG. 11.

What is claimed is:

1. A process for the controlled modification of the geometrical characteristics of the end of a monomode optical fiber, the fiber being formed from a central region and at least one peripheral region having different optical refraction indices, these index differences being obtained by incorporating in a basic material in a given percentage at least one doping material, which process comprises the following steps:
    previous preparation of the end of said fiber so as to obtain an endmost face free from splinters,
    chemical etching for a predetermined time at differentiated rates of said regions with given doping percentages at the end of the fiber,
    neutralization of the etching,
    injection into the fiber of guided radiation and control of the state of modification of said geometrical characteristics of the end of the fiber by plotting the variations of the remote field of said radiation radiated by said etched end.

2. The process as claimed in claim 1, with the optical fiber being of symmetry about an axis of revolution, wherein, during the step for previously preparing the end of the fiber, the endmost face of this end is broken slantwise so as to present an angle different by $\pi/2$ radians with the axis of symmetry so as to destroy the symmetry of revolution of said controlled modification of the geometrical characteristics.

3. The process as claimed in claims 1 or 2, comprising an additional step in which the profile of the remote field is compared with a reference profile to determine the overlapping integral of the two profiles and wherein the etching, neutralizing, plotting of the remote field and comparison steps are repeated iteratively until the overlapping integral of these two profiles reaches a maximum.

4. The process as claimed in claim 1, wherein, with the basic material being silica and the principal doping material boron, the etching is carried out by means of a 40% dilute hydrofluoric acid solution and neutralization of the etching is effected by cleaning with a water and alcohol solution.

5. The process as claimed in claim 1, wherein the plotting of the remote field is effected by measuring the optical intensity of said radiation radiated by the etched end by means of an opto-electronic detector.

6. The process as claimed in claim 5, wherein the opto-electronic detector is an array of photodiodes spaced equally apart.

7. A process for coupling a monomode optical fiber with another monomode optical element whose remote field profile is known comprising at least a first phase during which the end to be coupled of the fiber is modified by the process as claimed in claim 1 and a second phase during which the remote field profile of the fiber is compared with that of said monomode element to be coupled to as to match these two profiles.

8. A process for coupling a monomode optical fibers with another monomode optical element comprising at least a first phase during which the end to be coupled to the fiber is modified according to the process claimed in claim 1, and a second phase during which, with the monomode optical fiber and the other monomode optical element being moved in space with respect to each other to obtain maximum optical coupling, the efficiency of this coupling is measured.

9. The process as claimed in claim 8, wherein the monomode optical fiber and said other monomode optical element are further placed with respect to each other at a fixed pre-established distance.

10. The process as claimed in one of claims 8 or 9, wherein the first and second phases are repeated iteratively until a maximum optical coupling efficiency is obtained.

11. The process as claimed in claims 7 or 8, wherein the other monomode optical element is a semi-conductor laser.

* * * * *